April 20, 1926.
T. SUZUKI
1,581,245
MACHINE FOR CLEANING RICE AND THE LIKE
Filed August 1, 1923
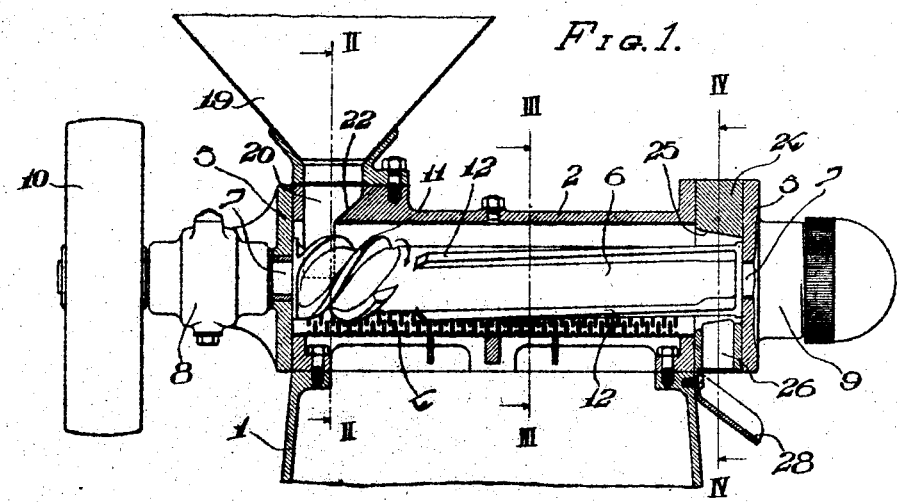
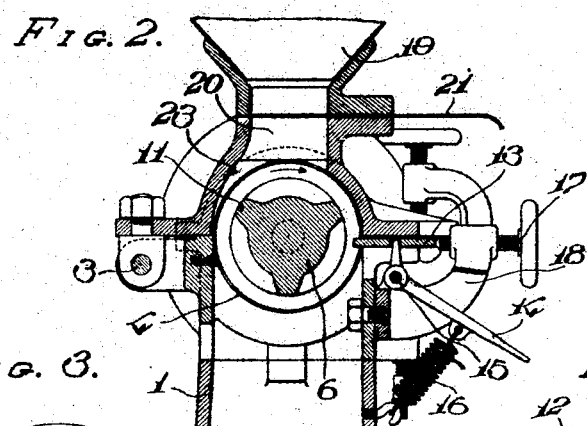
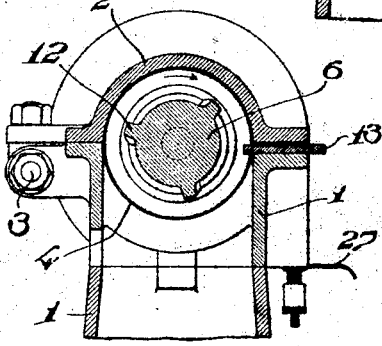
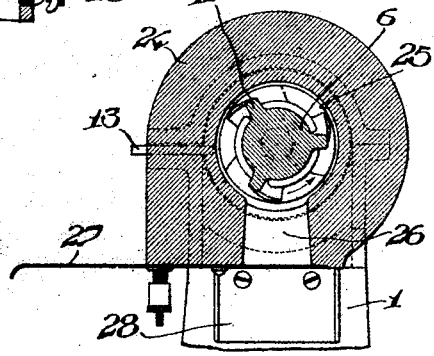
Inventor
T. Suzuki
By Marks v Clerk
Attys.

Patented Apr. 20, 1926.

1,581,245

UNITED STATES PATENT OFFICE.

TOMONORI SUZUKI, OF TOKYO, JAPAN.

MACHINE FOR CLEANING RICE AND THE LIKE.

Application filed August 1, 1923. Serial No. 655,122.

*To all whom it may concern:*

Be it known that I, TOMONORI SUZUKI, a subject of the Empire of Japan, residing at No. 7 Tsukishima Tori 8 Chome, Kyobashiku, Tokyo, Japan, have invented certain new and useful Improvements in Machines for Cleaning Rice and the like, of which the following is a specification.

My invention relates to improvements in machines for hulling rice and the like and has for its object to effectively hull rice, corn and like grains.

In the known rice hulling machines of the screw shaft type embodying a revolving shaft provided with spiral projections and longitudinal projections and which is arranged in a cylinder whose lower surface forms a bran screen and to coact with an adjustable longitudinally arranged resistance plate, the said screw shaft is rotated in the direction so as to press the rice on the lower surface of the cylinder forming the bran screen. However as the said bran screen is made of thin steel plate perforated with fine slots it does not sufficiently withstand the strong pressure required for the hulling of rice. Furthermore bran can not be sieved while rice is under pressure giving rise to an injurious heating of rice while being cleaned. According to the present invention the screw shaft is rotated in the opposite direction so as to press the rice at the upper side of the cylinder and relieve the pressure at the lower side forming the bran screen, in combination with a cylinder the end of which is conically tapered and having the rice outlet provided at the lower part thereof, whereby the operation of hulling rice as well as sieving bran is rendered effective so that the injurious beating of rice is avoided and the hulling or cleaning of rice is accelerated. Furthermore according to the present invention the rear wall of the rice is inclined forwardly and one side is enlarged so as to render the feeding and hulling of rice effective.

The accompanying drawing shows an example of the rice hulling machine embodying the present invention. Fig. 1 is a longitudinal sectional side elevation. Fig. 2 is a cross sectional elevation on the line II—II of Fig. 1. Fig. 3 is a cross sectional elevation on the line III—III of Fig. 1, and Fig. 4 is a cross sectional rear elevation on the line IV—IV of Fig. 1.

Referring now, more particularly, to the drawing there is provided a frame or stand 1 forming a box for receiving bran. A cover 2 of an inverted trough shape is hinged at 3 on one side of the frame 1 so that it can be opened. A trough shaped steel plate 4 perforated with fine slots or holes to form a bran screen is fixed inside the frame so as to form a hulling cylinder in combination with the cover 2 as shown in Fig. 3. End plates (5) (5) of the cylinder are fixed at the ends of the frame. A hulling or feeding screw comprising a revolving shaft 6 is arranged in the center of the cylinder and provided with axles (7) (7) at both ends respectively supported in a bearing 8 and a thrust bearing 9 formed on the end plates (5) (5). The shaft is driven by a pulley 10 or any other suitable driving mechanism. Spiral ribs 11 extend from the surface of the shaft 6 inside the cylinder and adjacent one end of the shaft while on the longer part of the shaft longitudinal ribs 12 slightly inclined in the direction of the screw are arranged as shown in Fig. 1. At one side of the cylinder where the edge of the cover 2 overlies the edge of the frame 1 a scouring and rubbing plate 13 as long as the cylinder is slidably arranged in the radial direction of the cylinder and has its inner edge projecting inside the cylinder so as to establish a suitable resistance for the passage of rice when the hulling screw is revolved. The scouring or rubbing plate 13 is apertured to receive one arm of a lever 14 fulcrumed at 15, the opposite arm of the lever being pulled downwardly by a spring 16 so that said resistance plate is pressed against adjusting screws 17 mounted in arms 18 fixed at the side of the frame 1, and the projecting degree of the scouring or rubbing plate is adjusted by revolving said screw.

At one end of the cylinder a funnel 19 is attached on the cover 2 and communicates with the cylinder through an inlet 20 provided with a sliding plate 21 for adjusting the supply of rice. The rear side of the inlet 20 is inclined forwardly as shown at 22 in Fig. 1, and one side of the inlet is enlarged to broaden the space between the screw shaft in comparison with the opposite side as shown at 23 in Fig. 2. The hulling screw or shaft 6 is revolved in the direction so that the spiral ribs 11 feed the rice supplied from the inlet 20 into the cylinder and press it on the upper side of the latter as shown with arrows in Figs. 1 and 2. At the other end of the cylinder a circular ring 24 having a conically tapered bore 25 at its center is interposed between the end plate 5 whereby the end of the cylinder is properly contracted and at the lower part of said ring 24 an outlet 26 provided with an adjusting plate 27 slidably inserted at its lower end is arranged as shown in Figs. 1 and 4. An inclined trough 2' fixed at the end of the frame 1 is arranged below the outlet 26.

Rice or other rough grain to be hulled or cleaned is received in the funnel 19 and is continually supplied into the cylinder by properly adjusting the sliding plate 21. As the rear side 22 of the inlet 20 is inclined forwardly and the left side 23 is enlarged as stated the rice supplied is directed toward the initial starting point of the spiral ribs 11 and effectively fed into the cylinder by the revolution of the hulling screw. The rice moves spirally along the cylinder while being agitated by the longitudinal ribs 12, and the scouring and rubbing plate 13 being projected at the right side of the cylinder it gives resistance to the passage of rice, so that the rice is pressed at the upper side of the cylinder and are thoroughly hulled. After having passed the part of the resistance plate 13 the pressure on the rice is relieved at the part of the screen plate 4 forming the lower side of the cylinder and the bran removed from the rice by the aforesaid hulling operation is sieved off by said screen while the pressure is relieved. Thus the rice is alternately pressed and relieved of pressure and sieved while moving spirally along the cylinder. The other end of the cylinder being conically tapered at 25 the rice is especially pressed therein and finally discharged through outlet 26 formed at the lower side effectively hulled.

I claim:—

1. In a hulling machine of the character described including a frame, a cylinder supported by the frame composed of an arched screen supported in the top of the frame, a cover hinged to the frame and coacting with the screen, coacting flanges projecting from the outer edge of the cover and the adjacent portion of the frame, a feeding and hulling screw mounted within the cylinder, means for admitting and discharging material with respect to the cylinder, a scouring and rubbing plate slidably mounted between the flanges on the frame and cover and provided with a slot, an arm extending laterally from the frame provided at its outer end with an internally threaded bearing arranged in alignment with the flanges, a manually operable screw mounted in the bearing for controlling the adjustment of the plate, the flange on the frame being provided with a slot beneath the opening, a bell crank lever pivotally mounted on the lateral arm having one portion arranged through the slot and engaged with the aperture in the plate, and a spring arranged between the other end of the lever and the frame for yieldingly holding the plate in an adjusted position against the screw.

2. A hulling machine of the character described including a hulling cyinder, a feeding and hulling screw mounted longitudinally within the cylinder and including spiral ribs adjacent the front end of the cylinder and longitudinally disposed ribs extending toward the other end of the cylinder, the top of the cylinder being provided adjacent the front end of the inlet opening the rear wall of which is in turn inclined towards the front end of the cylinder while the side wall of the inlet opening is enlarged at the side opposite the direction of rotation of the spiral ribs on the feeding and hulling screw to ensure of the incoming material being immediately engaged at the initial starting point of the ribs, and a discharge outlet at the opposite end of the cylinder.

In testimony whereof I have affixed my signature.

TOMONORI SUZUKI.